(12) United States Patent
Amon et al.

(10) Patent No.: US 7,769,790 B2
(45) Date of Patent: Aug. 3, 2010

(54) METHOD AND DEVICE FOR PROCESSING SCALABLE DATA

(75) Inventors: Peter Amon, München (DE); Andreas Hutter, München (DE); Thomas Rathgen, Ilmenau (DE)

(73) Assignee: Siemens Aktiengesellschaft, Munich (DE)

( * ) Notice: Subject to any disclaimer, the term of this patent is extended or adjusted under 35 U.S.C. 154(b) by 246 days.

(21) Appl. No.: 11/795,071

(22) PCT Filed: Dec. 16, 2005

(86) PCT No.: PCT/EP2005/056872

§ 371 (c)(1),
(2), (4) Date: Jul. 11, 2007

(87) PCT Pub. No.: WO2006/074851

PCT Pub. Date: Jul. 20, 2006

(65) Prior Publication Data

US 2008/0082482 A1   Apr. 3, 2008

(30) Foreign Application Priority Data

Jan. 11, 2005   (DE) ................. 10 2005 001 287

(51) Int. Cl.
G06F 7/00 (2006.01)
G06F 17/30 (2006.01)
(52) U.S. Cl. ..................................................... 707/812
(58) Field of Classification Search ............... None
See application file for complete search history.

(56) References Cited

U.S. PATENT DOCUMENTS

| | | | |
|---|---|---|---|
| 7,639,739 B2 * | 12/2009 | Rose et al. ............. | 375/240.01 |
| 2005/0204109 A1 * | 9/2005 | Apostolopoulos et al. ... | 711/163 |
| 2006/0090082 A1 * | 4/2006 | Apostolopoulos ........... | 713/189 |

OTHER PUBLICATIONS

Heiko Schwarz et al.; "SNR-Scalable Extension of H.264/AVC"; 2004 International Conference on Image Processing; pp. 3113-3116.
Edouard Francois et al.; "MPEG SVC: Why A New Video Coding Standard?"; BroadBand Europe, Paper 10-02; Dec. 2004; printed Feb. 15, 2006 from medicongress.be/UploadBroad/Session%2010/Paper%2010-02.pdf; pp. 1-5.
Heiko Schwarz et al; "MCTF and Scalability Extension of H.264/AVC"; Proc. PCS'04, Dec. 2004; 6 pp.
International Standard ISO/IEC 14496-15 1st Ed.; "Information Technology-Coding of Audio-Visual Objects—Part 15: Advanced Video Coding (AVC) File Format"; pp. i-v & 1.
Debargha Mukherjee et al.; Structured Scalable Meta-Formats (SSM) Version 1.0 for Content Agnostic Digital Item Adaptation; ISO/IEC JTC1/SC29/WG11/MPEG2002/M9131; Dec. 2002; pp. 1-101.
International Search Report for PCT International Application No. PCT/EP2005/056872; mailed March 13, 2006.

* cited by examiner

*Primary Examiner*—Uyen T. Le
(74) *Attorney, Agent, or Firm*—Staas & Halsey LLP

(57) ABSTRACT

The following are saved as a first dataset in a first order: basic information and a plurality of elements containing information during the decoding process. Details about the position of the elements in the first dataset are saved as a second dataset. Information about the conversion of the order of the elements from the first order into a second order is also available.

11 Claims, 3 Drawing Sheets

METHOD AND DEVICE FOR PROCESSING SCALABLE DATA

CROSS REFERENCE TO RELATED APPLICATIONS

This application is based on and hereby claims priority to German Application No. 10 2005 001 287.6 filed on Jan. 11, 2005, the contents of which are hereby incorporated by reference.

BACKGROUND

A method and a device for processing data, having basic information and elements with information supplementing the basic information, are described below.

In communication systems messages are transmitted between transmitters and receivers. A specific example of communication systems are radio communication systems. In radio communications systems messages such as signaling messages or user data messages with speech information, picture information, video information, SMS (Short Message Service), MMS (Multimedia Messaging Service) or other data for example are transmitted with the aid of electromagnetic waves over a radio interface between transmitting and receiving station. The stations can in this case, depending on the concrete embodiment of the radio communication system, be various types of subscriber-side radio stations, repeaters, or network-side radio stations such as base stations or radio access points. In a mobile radio communications system at least one part of the subscriber-side radio stations are mobile radio stations. The electromagnetic waves are emitted with carrier frequencies which lie in the frequency band provided for the relevant system.

Mobile radio communications systems are often embodied as cellular systems, in accordance with the GSM (Global System for Mobile Communication) or UMTS (Universal Mobile Telecommunications system) standard for example, with a network infrastructure including, for example, base stations, devices for checking and control of the base stations and further network-side devices. As well as these cellular, hierarchical radio networks organized on a wide-area (supralocal) basis, there are also Wireless Local Area Networks (WLANs) with a radio coverage area that as a rule is far more limited.

For the transmission of scalable information the basic information is transmitted, and in addition information which supplements the basic information. The characteristic of scalable data is thus that it can be present at the receiver in reduced quality, in that the receiver only decodes the basic information or the basic information and a part of the supplementary information, and not the basic information and all supplementary information. Data which is sent simultaneously to a number of subscribers can be present as scalable information at the sender in the best possible quality, i.e. as basic information and supplementary information. Before the data is transmitted or when it is being distributed in the network to the different receivers, an adaptation/scaling of the data is undertaken such that different parts of the supplementary information are forwarded to the different receivers, so that only the supplementary information needed by the respective receiver is transmitted. This proves advantageous especially with radio communication systems because of the scarce transmission resources.

SUMMARY

An aspect is to demonstrate a method and a device for processing scalable data.

In accordance with this aspect, the following are saved as a first dataset in a first order: Basic information and a plurality of elements containing information that supplements the basic information that increases the quality of the basic information during the decoding. The following is saved as a second dataset: Details about the position of the elements within the first dataset. The saved second dataset or a different dataset from the first and the second dataset contains information for converting the order of the elements from the first into the second order.

Both basic information and also supplementary information which increases the quality of the basic information exists when it is decoded in addition to the basic information. The basic information can also be decoded and processed without the supplementary information, it is not necessary for the supplementary information to be present for this to be done. The basic information and the supplementary information are both scalable information. When the scalable information is transmitted the transmission of the basic information preferably occurs before the transmission of the supplementary information.

The basic information and the supplementary information can be created by encoding data. The data can for example involve picture information, audio information, video information, which is encoded for example with an MPEG standard, speech information, or also a combination of these information types.

Two datasets are saved, which are separate from each other. The fact that two datasets are present means that the data of the first dataset and the data of the second dataset are not mixed when the data is read out from the datasets, if for example an amount of data of the first dataset is followed by an amount of data of the second dataset, after which comes data of the first dataset again. Thus the two datasets can be read out, without data of the other dataset in each case having to be read, the datasets are able to be read out separately. This can be implemented by the two datasets being saved as different files. The two datasets can be saved within the same or a different memory. The first and the second dataset can feature further content in addition to the content described.

The second dataset contains details about the position of the elements of the first dataset. This involves metadata since the data of the second dataset describes the data of the first dataset. The positions of the elements of the first dataset can be specified in relative terms, e.g. in relation to the position of another element, or also as absolute positions. The position can be specified by a pointer to the respective element. The specification of the position of an element enables access to this element, without other elements of the first dataset having to be read out or searched for.

Information for converting the order of the elements is present. This information can be held within the second saved dataset, or within another saved dataset different from the first and the second dataset. The dataset which differs from the first and the second dataset can be a dataset which is saved by the same device which also saves the first and the second dataset. Alternatively this dataset can be called by the device, which saves the first and the second dataset, or by another device.

In a specific order, elements have a particular sequence and where necessary a particular grouping. The second order can for example include leaving out of elements in relation to the first order or a particular grouping of elements. A reordering from the first into the second order can be implemented by leaving out elements from a particular element onwards, or through a rearrangement or new arrangement of the group elements with the sequence of the elements remaining the same or being changed.

The method can be applied in relation to a plurality of second orders.

The described method and further developments described below, are preferably executed by a device which includes a suitable memory such as an Internet server for example.

In a further development of the method, the stored second dataset contains further details about the way in which the supplementary information of the elements increases the quality of the basic information in each case. Thus a bitupel can exist within the second dataset for each element with supplementary information: the position specification and the specification of the way in which the quality is enhanced. This type of bitupel is preferably stored so that the position specification and the specification of the way in which the quality is enhanced are able to be read out directly after one another.

In particular the supplementary information can increase the quality of the basic information by increasing the temporal resolution and/or increasing the spatial resolution and/or improving the signal-to-noise ratio. The specifications can also contain quantitative details in relation to the improvement variables.

In an embodiment of the method, the order of the elements is converted from the first order into the second order and subsequently all or some of elements are sent. The reordering can in this case be used as a preparation for the transmission. The reordering and sending is preferably carried out by the same device that is responsible for the storage in accordance with the method or by a device that has access to a corresponding memory with the storage.

Preferably the information for conversion is determined from information which is sent from a future receiver of the basic information, and/or from information about the transfer of messages, especially the basic information, to a receiver. The information sent from a future receiver typically involves a specification relating to quality requirements of the receiver, equipment of the receiver or options or capabilities of the receiver for processing or outputting data. Information about the transfer of messages to a receiver can for example involve the traffic loading of a communication network which is responsible for the transport of the messages to the receiver, or the type of message transmission by this communication network.

The device for saving and processing data has means for saving basic information and a plurality of elements with information supplementing the basic information which when decoded increases the quality of the basic information, in a first order as first dataset, as well as means for saving details about the position of the elements within the first dataset as a second dataset. Furthermore means are present for storing within the saved second dataset or in a dataset which differs from the first and the second dataset information for converting the order of there elements of from the first into the second order or to call information for converting the order of the elements from the first into the second order.

A device on which data is encoded, may be used to save data in the manner described above and then sent, such as an Internet server for example. Such a device is especially suitable for executing the method in accordance with the invention, with this also being able to be applied to the embodiments and developments. To this end it can feature further suitable means.

BRIEF DESCRIPTION OF THE DRAWINGS

These and other objects and advantages will become more apparent and more readily appreciated from the following description of an exemplary embodiment, taken in conjunction with the accompanying drawings of which.

DETAILED DESCRIPTION OF THE PREFERRED EMBODIMENT

Figure 1:
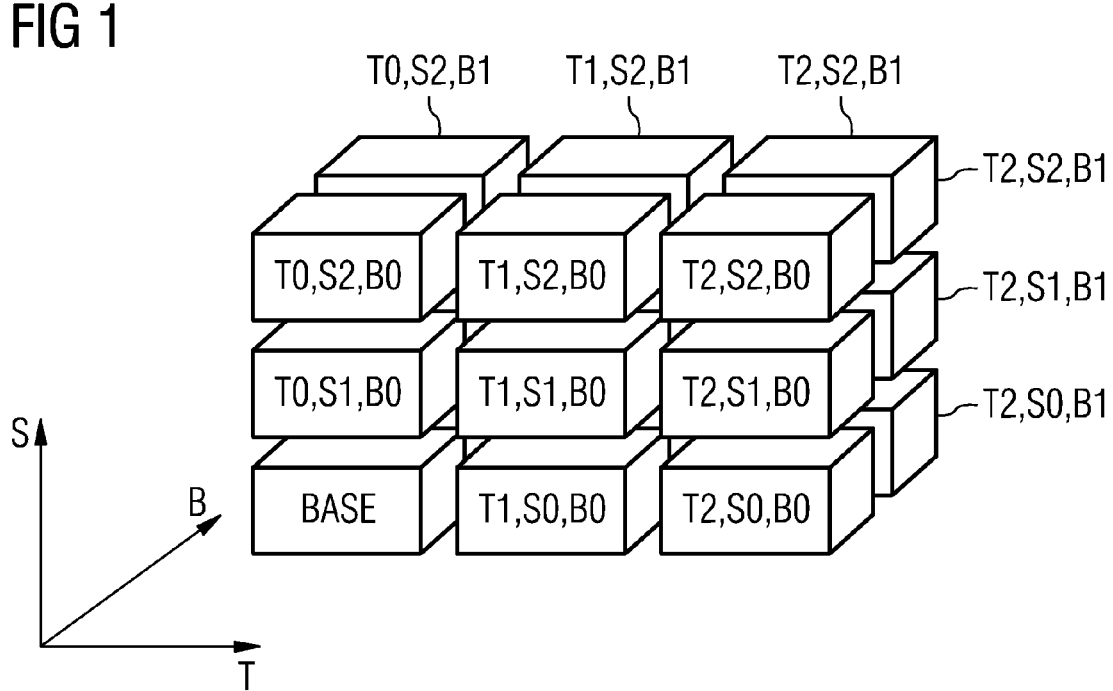
FIG. 1 is a three-dimensional view of a symbolic representation of the components of scalable data.

Reference will now be made in detail to the preferred embodiments, examples of which are illustrated in the accompanying drawings, wherein like reference numerals refer to like elements throughout.

The method explained below may be executed by an encoder, which can store, suitably prepare for sending and send the data encoded by it. An encoding of video information is considered as an example. The encoder considered is for example an Internet server. The encoder performs encoding of the video information, so that this is present as scalable data. Different components of scalable data are shown schematically in FIG. 1. The block in the lower left corner of FIG. 1 corresponds to the basic information BASE. The further blocks, indexed by the variables T, B and S, correspond to the supplementary information. The T axis running to the right specifies how many images will be sent per unit of time, for example the first blocks to the right can correspond to a data rate of 7.5 fps (fps: frames per second), the second block to the right to a data rate of 15 fps and the third block to the right to a data rate of 30 fps. The S axis running upwards specifies how good the local resolution of the relevant image is, i.e. how many pixels an image contains, for example the first blocks upwards can corresponds to QCIF (Quarter Common Intermediate Format, this is equivalent to an image size of 176×144 pixels), the second blocks upwards CIF (Common Intermediate Format, this is equivalent to an image size of 352×288 pixels and the third blocks upwards 4CIF (4 times Common Intermediate format, this is equivalent to an image size 704×576 pixels). The B axis running backwards specifies the signal-to-noise ratio (SNR) of an image. This means that the temporal resolution of the video information increases to the right, the spatial resolution upwards and the signal-to-noise ratio backwards. Each block of FIG. 1 contains the data which is needed to improve the visual quality by one stage in a direction of the three scalability dimensions.

The method can also be applied to still images. In this case only two dimensions exist instead of the three scalability dimensions of FIG. 1, the T axis is omitted. The method is also suitable for use with audio information. The use of a different number of scalability dimensions or other scalability dimensions compared to FIG. 1 in relation to video or other information is conceivable within the framework of the method.

It is basically sufficient for a receiver to receive and decode the basic information BASE, but this information is not of high quality. To enable it to display the video information, the user equipment must at least decode the basic information BASE. The decoding of each further block of FIG. 1 in addition to the basic information BASE improves the quality of the video information. Depending on the encoding method used, the blocks with the supplementary information cannot be combined in any sequence with the basic information BASE. Thus, with the scalable expansion of H.264/MPEG-4 AVC for example, the block T0, S2, B0 cannot be decoded before block T0, S1, B0.

The video information is output by the encoder in accordance with a scalable expansion of Standard H.264/MPEG-4 AVC, described for example in Heiko Schwarz, Detlev Marpe, and Thomas Wiegand: MCTF and Scalability Extension of H.264/AVC, Proc. PCS'04, San Francisco, Calif., USA, Dec. 15-17, 2004 in the form of NALUs (Network Abstraction Layer Units). The NALUs are logically combined to form the blocks of FIG. 1, with each block being able to contain one or more NALUs. The blocks of FIG. 1 can for example involve the encoded data for a Group of Pictures (GOP).

Corresponding file formats are defined for storage of the encoded data, as described for example in MPEG-4 Part 15 AVC File Format, in ISO/IEC 14496-15:2004, information technology—Coding of audio-visual objects—Part 15: Advanced Video Coding (AVC) file format, 2004.

This format defines that the bits of the images are stored directly in the file without start and stop codes, which are used as markings for detecting the start and the end of a packet for the transmission of the video information. An additional dataset, known as the hint track, contains information as to how the video information is packed for sending in RTP packet (RTP) Real-Time Transport Protocol) and can subsequently be sent. RTP is the protocol used for sending video information. Definitions of the so-called Random Access Recovery Points are contained in the stored video information which allow random access to the video information.

Figure 2:
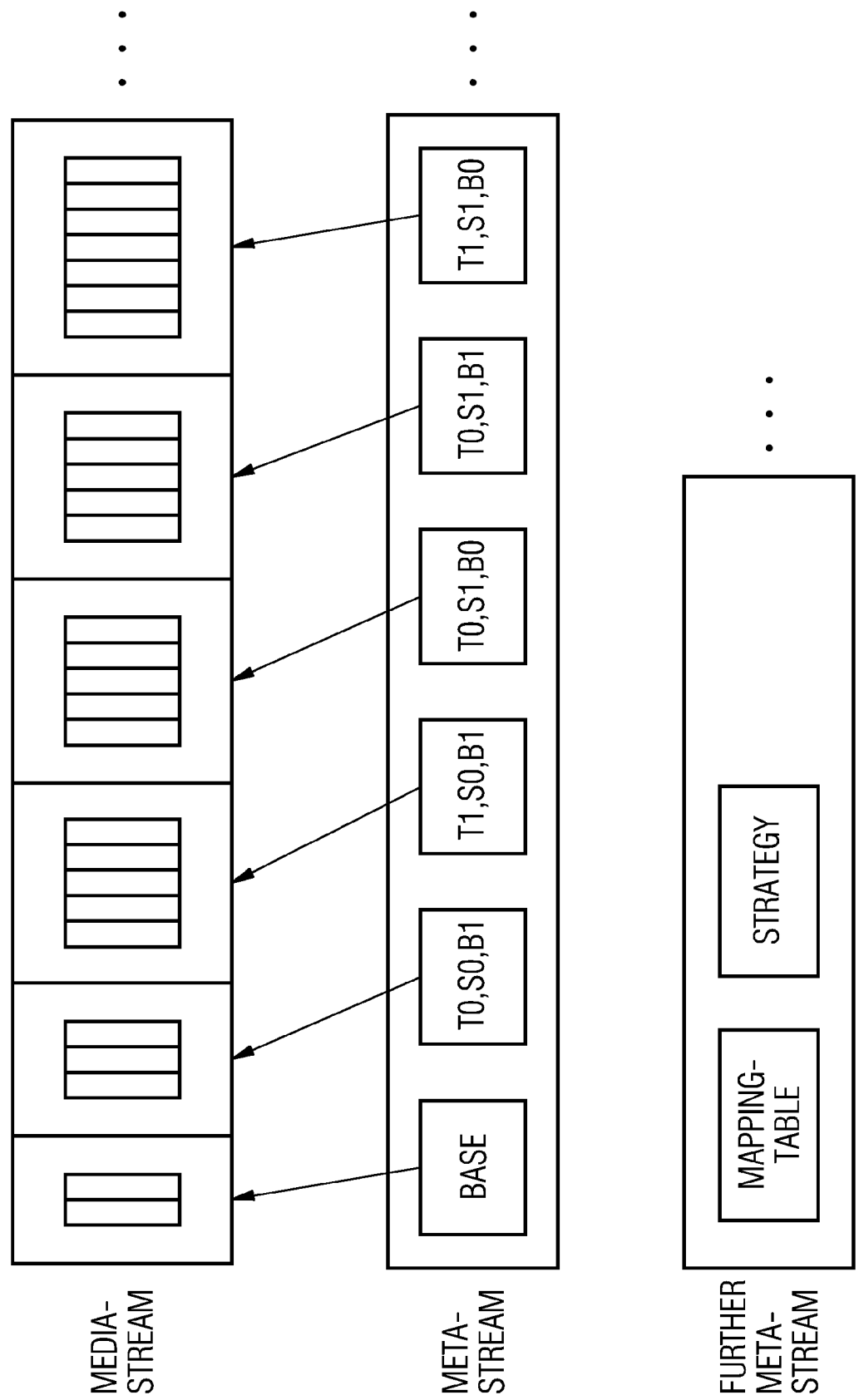
FIG. 2 is a data sequence diagram illustrating the saving of scalable data in a number of datasets.

FIG. 2 shows the storage of the video information in accordance with the method. A first stored dataset MEDIA-STREAM exists, which contains the NALUs. The NALUs are symbolized by vertical bars within the sections of the dataset MEDIA-STREAM. Within the dataset MEDIA-STREAM the NALUs are sorted according to classes, so that logically associated NALUs belong to a class. Thus the first section of the dataset MEDIA-STREAM contains the NALUs of the BASE block of FIG. 1. The second section contains the NALUs of block T0, S0, B1 of FIG. 1, the third section the NALUs of block T1, S0, B1 of FIG. 1, the fourth section the NALUs of block T0, S1, B0 of FIG. 1, the fifth section the NALUs of block T0, S1, B1 of FIG. 1 and the sixth section the NALUs of block T1, S1, B0 of FIG. 1. Each block of FIG. 1 or each section of the dataset MEDIA-STREAM of FIG. 2 corresponds to a class. In the example described a class only contains the NALUs of a spatial, a temporal and an SNR scaling stage. Thus for example video information for different spatial resolution stages is not to be found in a class. Other distributions of NALUs into classes are also possible, as well as another sequence of the classes within the dataset MEDIA-STREAM.

The NALUs of a class are stored consecutively in the dataset MEDIA-STREAM, so that when the video information is sent via RTP the number of accesses to the dataset MEDIA-STREAM remains as small as possible. When the NALUs are sent via RTP, the NALUs of a class are preferably combined in an RTP packet provided the length of the RTP packet allows this.

As well as the dataset MEDIA-STREAM there exists a further dataset META-STREAM. The two datasets MEDIA-STREAM and META-STREAM are preferably stored as two separate files. The dataset META-STREAM contain metadata for the dataset MEDIA-STREAM and is thus used for description of the dataset MEDIA-STREAM. The dataset META-STREAM contains pointers to the contents of the dataset MEDIA-STREAM, so that the position within the dataset MEDIA-STREAM at which the NALUs of the different classes, identified by the specification of the variables T, S and B are stored, can be taken from the dataset META-STREAM. As shown in FIG. 2 reference is made to each individual class. Within the individual classes there can be references, not shown in FIG. 2, to the individual NALUs of the respective class. Thus for example, when the position of the class T0, S0, B1 is specified within the dataset META-STREAM it can be specified at which position within the dataset MEDIA-STREAM the three NALUs of this class are located in each case. In this way, using the dataset META-STREAM, the elements or NALUs of the dataset MEDIA-STREAM can be accessed hierarchically.

In particular it is not necessary, in order to find the NALUs of a specific class or one NALU of a specific class, to search through the dataset MEDIA-STREAM or read out its contents. Instead the describing dataset META-STREAM allows access to the individual classes.

As well as the dataset META-STREAM, further additional datasets can be used, which make it easier to handle dataset MEDIA-STREAM, symbolized in FIG. 2 as further dataset FURTHER META-STREAM. Alternatively the information described below of the additional dataset FURTHER META-STREAM can also be included in the dataset META-STREAM.

The storage of assignment specifications MAPPING-TABLE of the classes to larger groups, referred to below as layers, is advantageous. A first layer can include the blocks T0, S1, B0, T1, S1, B0, T1, S0, B0, T0, S0, B1, T1, S0, B1, T0, S1, B1 and T1, S1, B1 for example, a second layer of the blocks T2, S0, B0, T2, S0, B1, T2, S1, B0 and T2, S1, B1, and a third layer of the blocks T0, S2, B0, T0, S2, B1, T1, S2, B0, T1, S2, B1, T2, S2, B0 and T2, S2, B1. The layers should be constructed so that each layer in at least one scaling direction, i.e. in relation to at least one of the axes T, S or B, must contain a higher resolution stage than the next lower layer The NALUs of a layer can only be decoded, if the NALUs of the previous layer were decoded. If a mapping specification MAPPING-TABLE is stored between the classes or NALUs and the layers, a layer-by-layer transmission instead of a class-by-class transmission can be undertaken when the video information is sent. In a layer-by-layer RTP transmission all NALUs of a layer are preferably contained in one RTP packet, provided the size of the RTP packet allows this, whereas with a class-by-class transmission all NALUs of a class are contained in an RTP packet provided the size of the RTP packet allows this. If this is not possible because of the restricted size of the RTP packet, the NALUs of a layer or a class are divided up into a number of consecutive RTP packets.

The layer-by-layer transmission of the scalable video information has the advantage that the scaling operations in the network which perform the forwarding to the terminal, or also the operations in the terminal, are less complex. Thus it can be decided in a distributor with a yes/no decision as to whether the NALUs of the next-higher layer are to be forwarded to a specific terminal or not, or a terminal can use a yes/no decision to decide whether the NALUs of the next-higher layers are to be decoded or not. With class-by-class transmission on the other hand there are more degrees of freedom as regards the classes to be decoded or to be forwarded, thus either the class T1, S1, B0 or the class T2, S0, B0 could be forwarded or decoded after the class T1, S0, B0. This has the advantage of greater flexibility.

The conversion specification MAPPING-TABLE between the classes and layers of the video information is advantageously made up of information which is sent out by the receiver of the video information. Thus the receiver can communicate which quality levels of the video information it expects or needs or can process. The encoder uses these specifications to form an assignment of classes to layers, with only the assignments of those layers being stored which are useful for the receiver. Before the transmission the NALUs from the dataset MEDIA-STREAM can then be packed into RTP packets in accordance with the information of the dataset META-STREAM and the conversion specification MAPPING-TABLE and sent to the receiver in accordance with the latter's requirements.

Figure 3:
FIG. 3 is a table showing the structure of an assignment table.

A concrete example is considered below. The receiver indicates that it cannot display the resolution 4CIF. If 4CIF corresponds to the third line of the blocks of FIG. 1, then at most the blocks of the first two lines are sent to the receiver. FIG. 3 shows an example of the structure of the assignment table MAPPING-TABLE stored in the dataflow FURTHER META-STREAM for this case of the receiver request: The basic information merely contains the block BASE, it makes up a separate layer, corresponding to the lowest layer. The first layer LAYER 1 includes the SNR updates of the basic information BASE (B=1) and the updates to the next temporal resolution (T=1). The second layer LAYER 2 contains all updates compared to the first layer LAYER 1 to the next spatial resolution (S=1). The third layer LAYER 3 contains all updates compared to the second layer LAYER 2 to the full temporal resolution (T=1).

Furthermore information STRATEGY can be stored in the dataset FURTHER META-STREAM about sensible scaling options. This includes for example which classes are to be transmitted to which types of receiver, which classes are to be sent under specific traffic conditions, which classes are to be sent for specific transmission modes, such as the low delay mode. In this way it can be stored that classes with a high spatial resolution are to be sent to mobile computers, whereas lower spatial resolutions are sufficient for mobile telephones because of their smaller displays. The information MAPPING-TABLE and STRATEGY can also be used in combination.

The information of the dataset FURTHER META-STREAM can be sent by the encoder into the communication network in order to be used there in the distribution of the video information to terminals. Thus for example the encoder of the NALUs can send all classes and additionally a conversion specification MAPPING-TABLE. When it receives this information a distribution device converts the class-by-class transmission into a layer-by-layer transmission and forwards the layers to a specific terminal. In this way a conversion can be undertaken of the scaling options at different points between a server and a terminal.

In accordance with the method, scalable data is stored according to a first order, in the concrete example according to classes, in a first dataset. Since under some circumstances a second order, referred to as layers in the concrete example, can prove more advantageous for a transmission of the scalable data, information is stored in another dataset which makes it possible to convert the first order into the second order This allows great flexibility in relation to the transmission of scalable data, a flexible adaptation to requirements in the network or to the options of the terminal is possible. The adaptation path is not defined by the storage of the data and the data can be scaled/adapted not only in the way predetermined by the first order. This flexibility can be maintained up to the point in time at which the data can be packed for transmission in packets, or by transmission of the mapping table, even forwarded to distributor stations.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method for processing data in a processing device, comprising:
    receiving, by the processing device, at least one of quality information relating to quality requirements, equipment information relating to equipment, and capability information relating to transmission capabilities;
    storing, as a first dataset in a first order, basic information and elements with supplemental information supplementing the basic information, which on decoding increases quality of the basic information;
    storing, as a second dataset, details of positions of the elements within the first dataset; and
    creating conversion information for converting the first order of the elements into at least one second order based on the at least one quality, equipment, and capability information received and storing the conversion information in one of the second dataset and a third dataset different from the first and second datasets.

2. The method as claimed in claim 1, further comprising storing in the second dataset additional details about how the supplemental information of the elements increases the quality of the basic information of the elements, respectively.

3. The method as claimed in claim 1, wherein the supplemental information enhances the quality of the basic information by at least one of increasing temporal resolution, increasing spatial resolution and improving a signal-to-noise ratio.

4. The method as claimed in claim 3, wherein at least one of the second orders includes leaving out elements in relation to the first order.

5. The method as claimed in claim 4, wherein the at least one second order includes a grouping of elements.

6. The method as claimed in claim 5, further comprising transmitting the elements after converting from the first order into the at least one second order.

7. The method as claimed in claim 6, wherein the conversion information is determined from at least one of information sent from a future receiver of the basic information, and information about transfer of messages to a receiver.

8. The method as claimed in claim 1, further comprising converting elements in the first order into converted elements in the at least one second order in accordance with the conversion information and transmitting the converted elements to the receiving device as the processed data.

9. The method as claimed in claim 8, wherein the at least one quality, equipment, and capability information received by the processing device is received from a receiving device intended to receive the processed data and the at least one quality, equipment, and capability information is quality information relating to quality requirements of the receiving device, equipment information relating to equipment of the receiving device, and capability information relating to transmission capabilities of the receiving device.

10. A device for saving and processing data, comprising:
    means for receiving, by the device, at least one of quality information relating to quality requirements, equipment information relating to equipment, and capability information relating to transmission capabilities;

means for storing, as a first dataset in a first order, basic information and elements with supplemental information supplementing the basic information, which on decoding increases quality of the basic information;

means for storing, as a second dataset, details about positions of the elements within the first dataset; and means for creating conversion information for converting the first order of the elements into at least one second order based on the at least one quality, equipment, and capability information received and storing the conversion information in one of the second dataset and a third dataset different from the first and second datasets.

11. The device as claimed in claim 10, wherein the at least one quality, equipment, and capability information received by the device is received from a receiving device intended to receive the processed data and the at least one quality, equipment, and capability information is quality information relating to quality requirements of the receiving device, equipment information relating to equipment of the receiving device, and capability information relating to transmission capabilities of the receiving device.

* * * * *